United States Patent

Palumbo et al.

[11] 4,139,416
[45] Feb. 13, 1979

[54] CARBONACEOUS MATERIAL WITH HIGH CHARACTERISTICS OF SURFACE AREA AND ACTIVITY AND PROCESS FOR PRODUCING THE SAME

[75] Inventors: Luigi Palumbo; Angelo Colletta, both of Rome, Italy

[73] Assignee: Centro Sperimentale Metallurgico S.p.A., Rome, Italy

[21] Appl. No.: 820,915

[22] Filed: Aug. 1, 1977

Related U.S. Application Data

[63] Continuation of Ser. No. 650,986, Jan. 21, 1976, abandoned.

[30] Foreign Application Priority Data

Jan. 21, 1975 [IT] Italy ............................... 47769 A/75

[51] Int. Cl.$^2$ ...................... C01B 31/10; C10B 47/24; C10B 57/02
[52] U.S. Cl. ......................................... 201/8; 201/29; 201/31; 201/37; 201/43; 201/44; 201/45; 252/421; 252/445; 423/449; 423/460
[58] Field of Search ...................... 201/45, 44, 43, 37, 201/31, 30, 29, 8; 252/421, 445; 423/445, 449, 460

[56] References Cited

U.S. PATENT DOCUMENTS

| | | | |
|---|---|---|---|
| 2,815,316 | 12/1957 | Kruppa et al. | 201/42 X |
| 3,051,628 | 8/1962 | Gorin et al. | 201/5 |
| 3,086,923 | 4/1963 | Destremps et al. | 201/44 X |
| 3,140,241 | 7/1964 | Work et al. | 201/5 |
| 3,184,397 | 5/1965 | Work et al. | 252/445 |
| 3,375,175 | 3/1968 | Eddinger et al. | 201/44 X |
| 3,414,480 | 12/1968 | Stotler et al. | 201/8 X |
| 3,444,046 | 5/1969 | Harlow | 201/8 X |
| 3,977,947 | 8/1976 | Pyle | 201/31 |

Primary Examiner—Morris O. Wolk
Assistant Examiner—Michael S. Marcus
Attorney, Agent, or Firm—Young & Thompson

[57] ABSTRACT

A carbonaceous material with high characteristics of surface area and activity is produced in a continuous process by heating and drying ground pit coal at 200 to 300° C. for 15 to 120 minutes in air, and then heating in two further stages in fluidized bed reactors. The first of these further stages is 400 to 600° C. for 10 to 60 minutes while the second is 800 to 1100° C. for 10 to 60 minutes. Tar is condensed from the offgases of the first further stage and the residual gas is divided and 10 to 95% recycled to the first further stage. Similarly, 10 to 95% of the off-gases from the second further stage are recycled.

3 Claims, 1 Drawing Figure

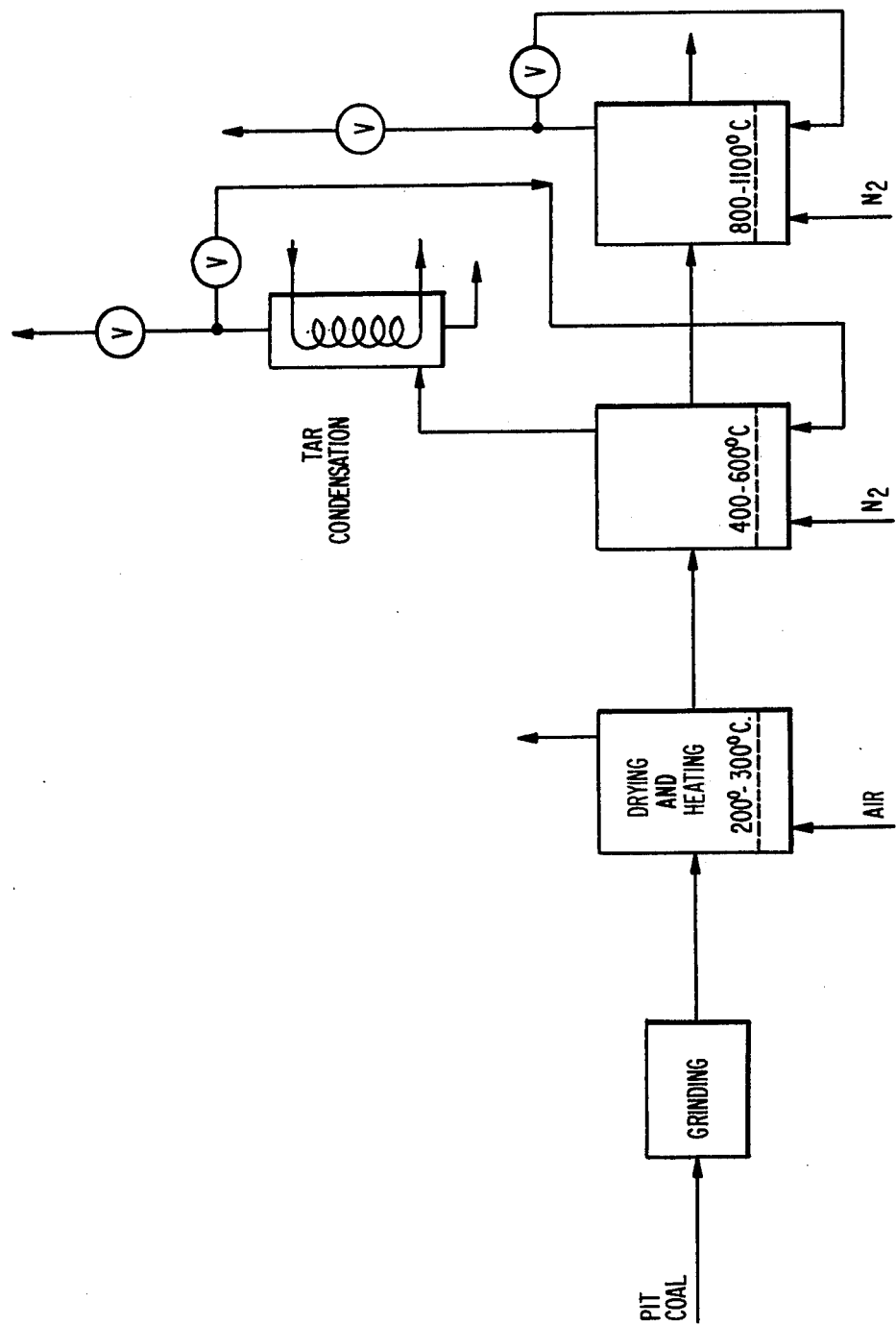

CARBONACEOUS MATERIAL WITH HIGH CHARACTERISTICS OF SURFACE AREA AND ACTIVITY AND PROCESS FOR PRODUCING THE SAME

This is a continuation, of application Ser. No. 650,986, filed Jan. 21, 1976 now abandoned.

The present invention relates to carbonaceous material having high characteristics of surface area and activity, and to a process for producing the same by continuous multi-stage fluidized bed techniques.

It is an object of the present invention to produce low cost carbonaceous material suitable for any number of applications where high characteristics of surface area and/or porosity and/or surface activity are required.

Briefly, the object of the invention is achieved by providing continuous methods for the production of carbonaceous material, characterized by the following steps, to be read in connection with the accompanying drawing which is a schematic flow diagram of a continuoue process according to the present invention:

1. Grinding to a grain size between 16 and 150 mesh;
2. Drying and heating in a fluidized bed reactor with supply of a gas which is 50 to 100% by volume air, 0 to 50% by volume steam, and 0 to 50% by volume nitrogen, at temperatures between 200° and 300° C. for a period of 15 to 120 minutes;
3. Heating the material from step 2 in a fluidized bed reactor with the introduction of make-up gas which initially is 50 to 100% by volume nitrogen, 0 to 20% by volume air and 0 to 50% by volume steam, at temperatures from 400° to 600° C. for a period of 10 to 60 minutes. The off-gases from this step are cooled to 15 to 90° C. to condense tars, the tars being then collected and used for other purposes. The remaining gaseous mixture is divided and 10 to 95% by volume recycled to this same heating step, the remainder being collected for use in other purposes in the metallurgical and chemical industries. Both the make-up gas and the recycled gas are used to fluidize the bed during start-up; but the recycled gas progressively replaces the make-up gas until no make-up gas is supplied to the bed when the cycle is at equilibrium, that is, fully onstream;
4. A second further heating step characterized by heating in a fluidized bed reactor with the introduction of make-up gas which initially is 30 to 100% by volume nitrogen and 0 to 70% by volume air, at a temperature of 800° to 1100° C. for 10 to 60 minutes. The off gases are divided and 10 to 95% thereof recycled to this same reactor, the balance being usable without further processing as a reducing agent in blast furnaces, in direct reduction plants or for any type of chemical process. Again, both the make-up gas and the recycled gas are used to fluidize the bed, but the recycled gas progressively replaces the make-up gas until 100% of the fluidizing gas is recycled gas.

It will of course be understood that the unrecycled portion of the off-gases from the last two heating steps is equal to the distillation gases from the respective steps because the amount of the fluidization gas is constant under steady or equilibrium conditions.

The carbonaceous material from the last and highest-temperature heating step has the following properties:

| | |
|---|---|
| - Average size of particles: | 0.4 to 3.0 mm. |
| - Lump density: | 0.20 to 0.76 g/cm$^3$ |
| - Composition on a dry basis in percent by weight: | |
| - Volatile material | 1.0–3.0 |
| Ash | 6.0–12 |
| Total sulphur | 0.2–1.0 |
| Carbon | 80–90 |
| Hydrogen | 1.0–2.0 |
| - Gross heat value | 6000–8000 kcal/kg |
| - Surface area | 30–300 m$^2$/g. |

The material has an E.C.E. reactivity of 0.91–2.51.

The carbonaceous material obtained by the practice of the present invention is useful, inter alia, as an adsorbent in applications in which activated carbon is now used, as a material for separating the components of gaseous or liquid mixtures according to the size or shape of the respective molecules, in applications in which molecular sieves are now used; to replace coke in the agglomeration of iron ore; and as a support material for both active and reactive material in processes such as metallurgical processes.

In order to enable those skilled in this art to practice the invention, the following illustrative example is given merely by way of illustration and not in any limitative sense:

EXAMPLE 40 pounds per hour of a conventional pit coal containing 25% by weight of volatile matter, 0.64% sulphur and 6.23% ash is subjected to a continuous process consisting of the following steps:

1. Grinding to a grain size in which 43.79% by weight are particles from 1.0–0.5 mm, 31.85% from 0.50–0.25 mm, 14,03% from 0.25–0.15 mm and 10.33% less than 0.15 mm;
2. Heating and drying at 260° C. in a fluidized bed reactor supplied with air as make-up gas at a flow rate of 6.3 m$^3$/hr measured at 20° C. and 1.1 atmosphere absolute, for 30 minutes;
3. Heating at 450° C. in a fluidized bed reactor supplied initially with nitrogen at a flow rate of 4.3 m$^3$/hr measured at 20° C. and 1.1 atmosphere absolute, for 30 minutes. The off-gases from this reactor are cooled to 55° C. to condense tar; and the residual gas is divided into two parts, and one part equal to 85% by volume is recycled to this same reactor and has a volume composition of oxygen 0.5%, methane 28.6%, carbon monoxide 14.3%, carbon dioxide 40.3%, ethane 14.3% and nitrogen 2.0%. The unrecycled portion is collected for other uses as explained above;
4. A still further heating step at 870° C. in a fluidized bed reactor supplied initially with nitrogen at a flow rate of 2 m$^3$/hr, measured at 20° C. and 1.1 atmosphere absolute, for 30 minutes. The off-gases from this reactor are divided into two parts, one of which is 70% by volume and is recycled to this same reactor and has a volume composition of 65% hydrogen, 12.1% nitrogen, 0.4% oxygen, 0.5% carbon dioxide, 20.0% carbon monoxide and 2.0% methane. The remaining 30% is collected for another use as described above.

The carbonaceous material produced according to this process has the following properties:

| | |
|---|---|
| - Average size of particles: | 0.7 mm |
| - Lump density: | 0.4 g/cm$^3$ |
| - Composition in per cent by weight: | |
| Volatile matter | 1.0% |
| Ash | 7.0% |
| Total sulphur | 0.2% |
| Carbon | 88% |
| Hydrogen | 1.2% |
| - Gross heat value: | 7000 kcal/kg |

| -continued | |
|---|---|
| - Surface area | 140 m²/g. |

The material had an E.C.E. reactivity of 1.10.

From a consideration of the foregoing disclosure, therefore, it will be evident that the initially recited object of the present invention has been achieved.

Although the present invention has been described and illustrated in connection with a preferred embodiment, it is to be understood that modifications and variations may be resorted to without departing from the spirit of this invention, as those skilled in this art will readily understand. Such modifications and variations are considered to be within the purview and scope of the present invention as defined by the appended claims.

What is claimed is:

1. A continuous process for the production of carbonaceous material with high properties of surface area, porosity and surface activity, comprising grinding pit coal, drying and heating the ground coal in a first stage at a temperature of 200° to 300° C. for 15 to 120 minutes by fluidizing the ground coal with gas consisting essentially of 50 to 100% by volume air, 0 to 50% by volume steam and 0 to 50% by volume nitrogen in addition to that present in said air thereby to produce a dried and heated material; heating said material by fluidization in a second heating stage with a fluidizing gas that is initially 0 to 20% by volume air, 0 to 50% by volume steam, and 50 to 100% by volume nitrogen in addition to that present in any supplied air, at 400° to 600° C. for 10 to 60 minutes, thereby to produce a further heated material and off-gases; cooling said off-gases to produce condensed tar and residual gases; passing the further heated material from said second heating stage to a third heating stage, still further heating the material by fluidization in said third heating stage with a fluidizing gas that is initially 0 to 70% by volume air and 30 to 100% nitrogen in addition to that present in any supplied air, at 800° to 1100° C. for 10 to 60 minutes with the production of off-gases; recycling to said second heating stage as fluidizing gas 10 to 95% by volume of said residual gases; recycling to said third heating stage as fluidizing gas 10 to 95% by volume of said off-gases from said third heating stage; replacing said fluidizing gases in said second and third heating stages substantially entirely with said recycled residual gases and off-gases, respectively, by the time said process is fully on-steam; and cooling said still further heated material below a temperature of 100° C. to produce a particulate carbonaceous material having the following properties:

| average size of the particles | 0.4 to 3.0 mm |
|---|---|
| lump density | 0.20 to 0.76 g/cm³ |
| composition in per cent by weight: | |
| - volatile matter | 1.0 - 3.0 |
| - ash | 6.0 - 12.0 |
| - total sulphur | 0.2 - 1.0 |
| - carbon | 80 - 90 |
| - hydrogen | 1.0 - 2.0 |
| heat value | 6000 - 8000 kcal/kg |
| surface area | 30 - 300 m²/g. |

2. A method as claimed in claim 1, in which said residual gas recycled to said second heating stage is about 95% by volume thereof.

3. A process as claimed in claim 1, in which said off-gas recycled to said third heating stage is equal to about 70% by volume thereof.

* * * * *